UNITED STATES PATENT OFFICE.

CARL RUMPFF, OF APRATH, NEAR ELBERFELD, PRUSSIA, GERMANY.

MANUFACTURE OF DYE-STUFF.

SPECIFICATION forming part of Letters Patent No. 262,620, dated August 15, 1882.

Application filed May 16, 1882. (Specimens.)

*To all whom it may concern:*

Be it known that I, CARL RUMPFF, residing at Aprath, near Elberfeld, in the Kingdom of Prussia and Empire of Germany, have invented a new and useful Improvement in the Manufacture of Dye-Stuffs or Coloring-Matters, of which the following is a specification.

This invention relates to a brown dye-stuff or coloring-matter which is produced by the action of diazoazobenzolsulphonic acids upon naphthylaminsulphonic acid.

In carrying out this invention fifty pounds of amidoazobenzolsulphonate of soda are dissolved in five hundred pounds of water, and by the addition of fifty pounds of muriatic acid and twelve pounds of sodium nitrite converted into the diazoazobenzolsulphonic acid. After several hours' rest this liquid is mixed with a solution of forty-five pounds of naphthylaminsulphonate of soda dissolved in five hundred pounds of water, and the solution is neutralized with dilute solution of ammonia. The liquid gets dark-brown colored, and after several hours' rest the formation of the dye-stuff is finished. The coloring-matter is precipitated with muriatic acid and a solution of common salt in water, filtered off, and dried.

My dye-stuff, when dry, appears as a dark-brown powder. It is soluble in hot water, and its aqueous solution takes a brown color by the addition of alkaline. Muriatic acid or sulphuric acid dyes the aqueous solution bluish red. It dyes wool and silk in a dark reddish-brown color in an acidulated bath, and this color is fast against soap and light.

What I claim as new, and desire to secure by Letters Patent, is—

1. The product described, consisting of a new brown dye-stuff or coloring-matter which is produced by the action of diazoazobenzolsulphonic acids upon naphthylaminsulphonic acid.

2. The process of preparing the within-described brown dye-stuff, consisting in combining diazoazobenzolsulphonic acid with a solution of naphthylaminsulphonate of soda, as set forth.

CARL RUMPFF.

Witnesses:
ANTHONY GREF, Jr.,
WM. A. POLLOCK.